May 16, 1950  H. F. SPATZ  2,507,738
AUTOMATIC AUTOMOBILE WHEEL SANDER
Filed Aug. 23, 1946
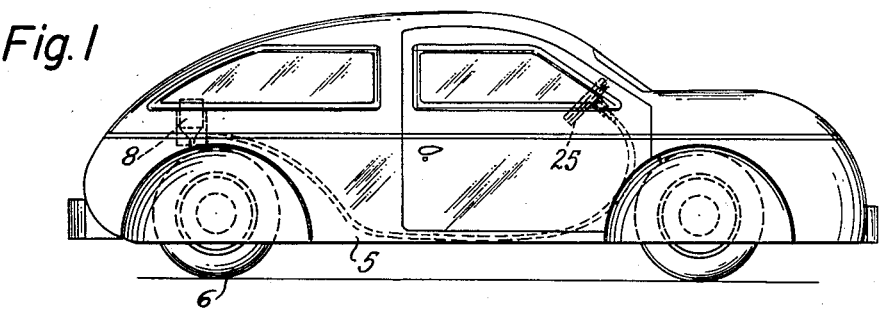
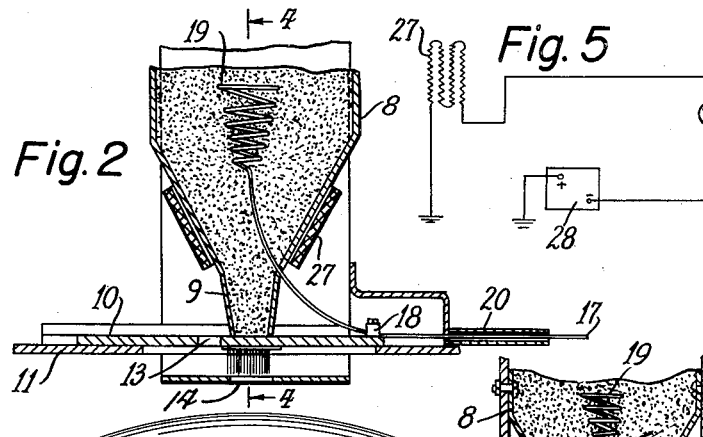
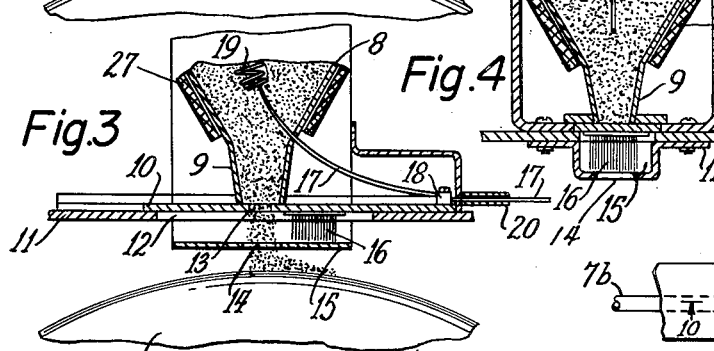
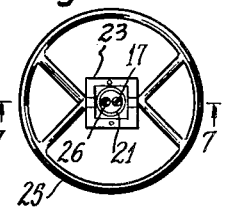
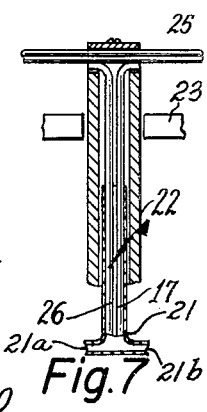
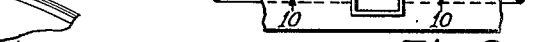
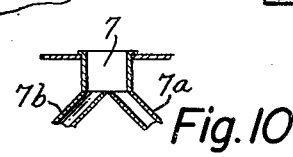
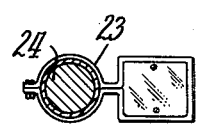
INVENTOR.
HARRY F. SPATZ
BY Carl Miller
ATTORNEY

UNITED STATES PATENT OFFICE 2,507,738

AUTOMATIC AUTOMOBILE WHEEL SANDER

Harry F. Spatz, Woodhaven, N. Y.

Application August 23, 1946, Serial No. 692,556

1 Claim. (Cl. 291—34)

This invention relates to an improvement over the invention shown in my prior patent, No. 2,322,171, issued June 15, 1943, and one of the objects of the present invention is to provide an improved slide valve and an agitator which operates automatically when the slide valve is operated.

Another object of the invention is the provision of a pull and push wheel which is located slightly underneath the steering wheel of an automobile, that may be operated by the driver without his taking his hands off the steering wheel, or eyes off the road ahead, by simply pulling up the first mentioned wheel with the ends of his fingers, in order to release sand and by pushing downwardly the same wheel to discontinue the flow of sand, and means for simultaneously operating the slide valve for both rear wheels, so that sand will be released at the same time in equal amounts to the right and left rear wheels and equal resistance to skidding will be maintained.

Another object of the invention is the provision of a primary sand supply and a secondary sand supply for each of the rear wheels, so that ample sand may be carried by a road vehicle.

With the above and other objects in view the invention comprises certain new and useful constructions, combinations and arrangements of parts, clearly described in the following specification, and fully illustrated in the drawings, in which:

Figure 1 is a side elevation of an automobile equipped with my safely sanding device.

Figure 2 is a vertical sectional view through one of the wheel sanders, taken on an enlarged scale.

Fig. 3 is a similar view, showing the slide valve in open position.

Fig. 4 is a vertical sectional view, taken on line 4—4 of Fig. 2, looking in the direction of the arrows.

Fig. 5 is a diagrammatic view showing the circuit for the electrical sand heater unit.

Fig. 6 is a detail plan view showing the pull and push wheel for simultaneously operating both sand release valves.

Fig. 7 is a detail vertical sectional view, taken on line 7—7 of Fig. 6, looking in the direction of the arrows.

Fig. 8 is a detail sectional view showing the manner of mounting the pull and push wheel of the sanding unit on the steering post of the vehicle.

Fig. 9 is a fragmentary plan view of the main supply hopper or container of the sander.

Fig. 10 is a detail vertical sectional view, taken on line 10—10 of Fig. 9, looking in the direction of the arrows.

Referring to the drawings, which illustrate the practical embodiment of the invention, 5 designates a conventional road vehicle or automobile, having rear wheels 6. Within the body of the vehicle 5 a main sand container or main hopper reservoir 7 shown in Figures 9 and 10 is located therein, and is connected by twin ducts 7a and 7b to sand hoppers 8 to discharge into the wheel supply hoppers 8, and each of these supply hoppers in turn is arranged to discharge sand or any other suitable material directly over the center of the periphery of each of the rear wheels 6. It will be noted that each of these wheel hoppers 8 is mounted in place so that each of its lower ends 9 will discharge directly over the center of the driving wheels 6.

The lower end of the hopper 8 is normally closed by means of the horizontal slide valve or plate 10, which slides on the runner strips or guides 11, which are spaced apart from each other to provide a dispensing gap 12. The slide valve or plate 10 is formed with a sand dispensing hole or opening 13, which when it is in registration with the discharge end of the hopper 8 permits gravity flow of the sand from the hopper 8 onto the tread surface of the wheel 6.

The sand flows also through the hole 14 of the plate 15, which is spaced below the valve plate 10. The valve plate 10 is equipped with wire or other bristles or scraping elements 16, which are designed to have a wiping action on the edges of the hole 14 of the lower plate 15.

An operating flexible wire 17 is clamped to the end of the valve plate 10 by means of the binding post 18, and is extended beyond this binding post and connected to the inverted conical wire coil agitator 19, which is freely movable in the wheel hopper 8, being limited in its movements only by distance of the slide valve movement since the sand within each hopper is within the car body protected from the weather and moisture there is little possibility of the sand caking up within the hopper. Whatever moisture does enter the sand will be taken care of by the heater to be described hereinafter. Referring to Fig. 3 it is seen that the wire 17 slidably fits within a tube 20 which is connected by any convenient coupling means (not shown) to either the opening 21a or 21b of the T connected to a tubing 21. Tubing 21 is surrounded by a larger tube 22 which in turn is held to the steering post 24 by a bracket 23 shown in Figures 6, 7 and 8. A pull and push wheel 25 is movably secured to a frame 23 for moving the wire 17 and another wire 26, which is connected thereto, as shown in Fig. 7, and which has connection with the left rear wheel sand slide valve, not shown, but which is a duplicate of the sand valve shown in Figs. 2, 3 and 4.

By pulling this wheel 25 upwardly both flexible wires 17 and 26 will be placed under manual pressure and the slide valves will be shifted to open position, as shown in Fig. 3, thereby releasing the sand to both rear wheels at the same time. When the valves are thus operated the agitators will also be operated, so that sand will start to flow the minute the valves are shifted to open positions. By pushing down on the wheel 25 both sand valves may be closed.

The sand is kept in a flowing condition during cold weather when skidding is most commonly experienced and most dangerous, by means of an electrical heater unit 27, which is installed around the wheel hopper 8. This heater unit is supplied with electrical current from the battery 28, of the road vehicle 5, which may be enlarged for this purpose.

Should any ice interfere with the discharge of the sand the scraper 16 will break up this ice as it passes over the lower outlet plate, and a certain amount of heat will be transferred to this plate by the conduction of heat from the heated wheel hopper 8.

It is understood that various changes in the details of construction, their combination and arrangement, may be made, in carrying out the invention, as defined in the claim hereof.

Having described the invention, I claim as new:

A sand dispensing device for wheeled vehicles comprising a sand dispensing hopper adapted to lie over a wheel of the vehicle, a horizontally extending guide lying below the hopper, a slide valve plate slidably connected to the guide for adjustment thereover, said slide valve plate having an opening adapted to be aligned with the lower end of the hopper to permit the discharge of sand therefrom, a second plate disposed below the guide and fixed relative to the lower end of the hopper and having an opening aligned therewith whereby when the slide plate is adjusted so that its opening is aligned with the hopper, sand may drop directly to the wheel, scraping means connected to the slide plate and depending therefrom and adapted to run over the plate surface to scrape therefrom any sand which may have collected about its opening to discharge it through the opening upon the return of the slide plate, a spring coil disposed within the hopper and having a flexible operating wire extending through the side of the hopper and connected to the slide plate whereby to cause the expansion and contraction of the spring coil as the plate is operated to agitate the sand within the hopper and to cause its travel to the lower end thereof, and means adapted to extend through the vehicle for access to the operator to effect the operation of the slide plate, the spring coil and the scraping means.

HARRY F. SPATZ.

REFERENCES CITED

The following references are of record in the file of this patent:

UNITED STATES PATENTS

| Number | Name | Date |
|---|---|---|
| 563,237 | Porter | June 30, 1896 |
| 746,691 | Gardner | Dec. 15, 1903 |
| 1,106,686 | Swarovski et al. | Aug. 11, 1914 |
| 1,243,632 | Roth et al. | Oct. 16, 1917 |
| 1,546,279 | Adkins et al. | July 14, 1925 |
| 1,691,298 | Minier | Nov. 13, 1928 |
| 2,322,171 | Spatz | June 15, 1943 |